(12) United States Patent
Biggs

(10) Patent No.: US 9,178,373 B2
(45) Date of Patent: Nov. 3, 2015

(54) ALTERNATOR CONTROL SYSTEM AND METHOD

(71) Applicant: Daniel C. Biggs, Reminderville, OH (US)

(72) Inventor: Daniel C. Biggs, Reminderville, OH (US)

(73) Assignee: CANADUS POWER SYSTEMS, LLC, Warrensville Heights, OH (US)

( * ) Notice: Subject to any disclaimer, the term of this patent is extended or adjusted under 35 U.S.C. 154(b) by 344 days.

(21) Appl. No.: 13/762,968

(22) Filed: Feb. 8, 2013

(65) Prior Publication Data

US 2014/0225555 A1    Aug. 14, 2014

(51) Int. Cl.
*H02J 7/14* (2006.01)
*H02J 7/00* (2006.01)

(52) U.S. Cl.
CPC *H02J 7/0052* (2013.01); *H02J 7/14* (2013.01)

(58) Field of Classification Search
CPC ........................................................ Y02E 60/12
USPC .......................................................... 320/107
See application file for complete search history.

(56) References Cited

U.S. PATENT DOCUMENTS

| | | | | |
|---|---|---|---|---|
| 6,414,464 | B2* | 7/2002 | Peter | 320/104 |
| 2014/0095018 | A1* | 4/2014 | Atluri et al. | 701/36 |
| 2014/0125296 | A1* | 5/2014 | Chassard et al. | 322/22 |
| 2014/0167707 | A1* | 6/2014 | Brunstetter et al. | 320/162 |

* cited by examiner

*Primary Examiner* — Suresh Memula
(74) *Attorney, Agent, or Firm* — Thompson Hine LLP

(57) ABSTRACT

An alternator control system for an alternator having an internal output voltage regulator that measures and regulates the charging voltage through an internal feedback line may include a switch on the internal feedback line; a variable voltage source connected to the internal output voltage regulator; an external feedback line configured to be connected to measure a condition of the battery receiving the charging voltage at the battery; and a controller connected to receive a signal corresponding to the condition of the battery over the external feedback line, and in response thereto, selectively open the switch, and selectively actuate the variable voltage source to selectively vary the voltage input to the internal output voltage regulator, thereby causing the internal output voltage regulator to signal the alternator to correspondingly vary the output voltage so that a voltage reaching the battery is at a pre-set value.

20 Claims, 2 Drawing Sheets

ALTERNATOR CONTROL SYSTEM AND METHOD

FIELD

The present invention relates to methods and systems for controlling the voltage output of alternators, and more particularly, to methods and systems for controlling the output of alternators used to maintain a charge in batteries.

BACKGROUND

There are many applications in which it is necessary to provide substantially continuous power from an internal combustion engine. For example, in natural gas well field operations, an internal combustion engine may be provided to operate compressors and other equipment. Such internal combustion engines may operate unattended twenty-four hours a day, seven days a week. In such applications, it is necessary to maintain a charge in the battery associated with such internal combustion engines, which typically is a wet cell battery.

Such engines may use an alternator, which is driven by the engine. An example of such an alternator is the alternator 10 shown in FIG. 1. That alternator 10 has an output 12 connected to a wet cell battery or batteries 14. The alternator 10 may include an internal regulator 16 that monitors the output voltage of the alternator through an internal feedback loop 18, which typically is located inside the alternator. The internal regulator may maintain the voltage output by the alternator 10 at typically a constant voltage, for example, 14 volts in a 12 volt system. A disadvantage of such an alternator 10 is that the battery 14 may be subjected to environmental conditions during the course of a day or a season that may require an increase or decrease in charging voltage output by the alternator. For example, on a relatively cold day, it may be desirable to increase the charging voltage from the output 12 from 14 volts to 14.2 volts or 14.3 volts. Additionally, there may be line losses between the output 12 of the alternator 10 and the battery 14 so that the voltage actually delivered at the battery terminals may be less than that measured at the output of the alternator by the internal regulator 16.

As shown in FIG. 2, to address this situation, an alternator 20 may include an internal regulator 16 that is connected by a wire 22 to the terminals 24 on the battery 14 to provide a remote sense capability. Typically, the wire 22 runs alongside the larger current-carrying conductor 26 from the output 12 to the battery 14. An alternator 20 equipped with an external wire 22 connected to battery terminals 24 provides a more accurate charging voltage because it cancels out any voltage drop along the conductor 26 or due to resistance at connection points at the output 12 or at the battery 14. Although a system comprised of an alternator 20 and external wire 22 for remote sense capability has the advantage of low cost of manufacture and a feedback loop superior to that of the alternator 10 of FIG. 1, there is a disadvantage in that they introduce an additional failure mechanism into the electrical system.

If the wire 22 providing feedback to the internal regulator 16 is compromised, or its connections to the battery or alternator are compromised, the alternator 20 loses its feedback loop, and the internal regulator is no longer able to control the voltage of the output 12. In such a condition, the output voltage of the alternator 20 would then rise to unsafe levels. This event has the potential to destroy the alternator 20, the battery 14 and possibly other sensitive electronics. Because of the potential harm resulting from this failure mode, the benefits provided by such a remote sense alternator system may not justify the risks.

Other systems such as temperature compensation circuits or custom external regulators also share this same problem. If the feedback loop is compromised the alternator can no longer control its output voltage, which may have the potential of destroying components of the electrical system. Accordingly, there is a need for an alternator system and method that utilizes a remote sensor, but eliminates the risks associated with a breakdown in the feedback circuit.

SUMMARY

In an embodiment, an alternator control system is described for use with an alternator configured to provide a charging voltage to a battery and having an internal output voltage regulator that measures and regulates the charging voltage through an internal feedback line. The system may include a switch on the internal feedback line; a variable voltage source connected to the internal output voltage regulator; an external feedback line configured to be connected to measure a condition of the battery receiving the charging voltage at the battery; and a controller connected to receive a signal corresponding to the condition of the battery over the external feedback line, and in response thereto, selectively open the switch, and selectively actuate the variable voltage source to selectively vary the voltage input to the internal output voltage regulator, thereby causing the internal output voltage regulator to signal the alternator to correspondingly vary the output voltage so that a voltage reaching the battery is at a pre-set value.

In another embodiment, an alternator control system is described for use with an alternator configured to provide a charging voltage to a battery and having an internal output voltage regulator that measures and regulates the charging voltage through an internal feedback line. The system may include a switch on the internal feedback line; a variable voltage source connected to the internal output voltage regulator; an external feedback line configured to be connected to a battery monitor located remote from the alternator and at the battery to measure a condition of the battery receiving the charging voltage at the battery; and a controller connected to receive a signal from the battery monitor corresponding to the condition of the battery over the external feedback line, and in response thereto, selectively open the switch, and selectively actuate the variable voltage source to selectively vary the voltage input to the internal output voltage regulator, thereby causing the internal output voltage regulator to signal the alternator to correspondingly vary the output voltage so that a voltage reaching the battery is at a pre-set value.

In yet another embodiment, a method is described for controlling an alternator for use with an alternator configured to provide a charging voltage to a battery and having an internal output voltage regulator that measures and regulates the charging voltage through an internal feedback line. The method may include providing a switch on the internal feedback line; providing a variable voltage source connected to the internal output voltage regulator; measuring a condition of the battery receiving the charging voltage at the battery through an external feedback line; and receiving a signal corresponding to the condition of the battery over the external feedback line, and in response thereto, selectively opening the switch, and selectively actuating the variable voltage source and selectively varying the voltage input to the internal output voltage regulator, thereby causing the internal output voltage regulator to signal the alternator to correspondingly vary the output voltage so that a voltage reaching the battery is at a pre-set value.

Other objects and advantages of the disclosed alternator control system and method will be apparent from the following description, the accompanying drawings, and the appended claims.

DETAILED DESCRIPTION

Figure 3:
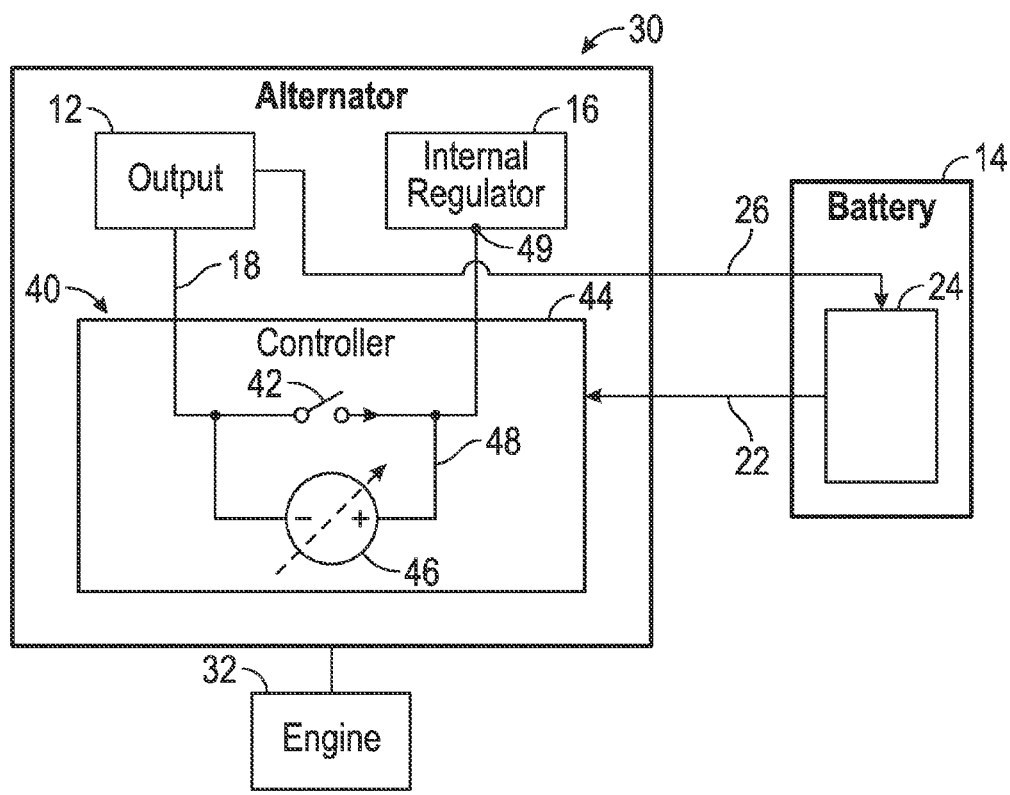
FIG. 3 is a schematic representation of an embodiment of the disclosed alternator control system.

As shown in FIG. 3, an alternator 30 is provided with an embodiment of the disclosed alternator control system, generally designated 40. The alternator 30 may be adapted to be driven by an associated internal combustion engine 32, and may be driven at a constant speed, or a variable speed over time. The alternator control system 40 may be integrated into a standard internal feedback-regulated alternator 30, which may include an output 12 for outputting a charging voltage over cables 26 to the terminals 24 of a battery or battery array 14, and an internal voltage regulator 16 that reads the charging voltage at the output 12 through a feedback line 18 that is internal to the alternator 30.

The system 40 may be mounted on, near, or internal to, the alternator 30, and may include a switch 42, which may be a normally-closed relay or an electronic equivalent, on feedback line 18. When the switch 42 is closed, as shown in FIG. 3, the alternator control system 40 may be completely removed from the feedback line 18, in which case the regulator 16 may receive feedback internally, just as it would have if the alternator control system 40 were not present. The alternator control system 40 may include a controller 44, which may be a circuit board or a programmable logic controller, and an adjustable voltage source 46 on a bypass line 48. The adjustable voltage controller 46 may be controlled by the controller 40. Bypass line 48 may be connected to feedback line 18 such that the adjustable voltage source 46 may be in parallel with switch 42.

Controller 44 may be connected to the external feedback line 22 that is connected to the terminals 24 of the battery 14. The controller 44 may be configured to actuate the adjustable voltage source 46 to vary the voltage outputted by the adjustable voltage source, which, when the switch 42 is open, may add a positive or negative voltage to the voltage flowing through bypass line 48 flowing through feedback line 18 from the output 12 to the internal regulator 16. The controller 44 may be configured to selectively open and close the switch 42. By opening the switch 42 and actuating the adjustable voltage source 46, the controller 40 may manipulate the voltage flowing through the internal feedback line 18 by placing a positive or negative voltage in series with the internal feedback line. Because the internal regulator 16 will try to maintain its voltage set point measured at the regulator feedback input 49, commonly 14 volts in a 12 volt system, the voltage at the alternator output 12 will be, in this example, 14 volts plus or minus the voltage added or subtracted by the adjustable voltage source 46 on bypass line 48 connected in series with line 18.

Accordingly, the controller 40 may adjust the output voltage of the alternator 30 while still utilizing the factory-fixed internal regulator 16 supplied by the manufacturer of the alternator. The controller 40 may be configured such that if an error condition were to occur, or there was a loss of power to the controller, the controller 40 may actuate the switch 42 back to the closed position, and disabling the adjustable voltage source 46, thereby restoring internal feedback and thereby protecting the electrical system.

Figure 4:
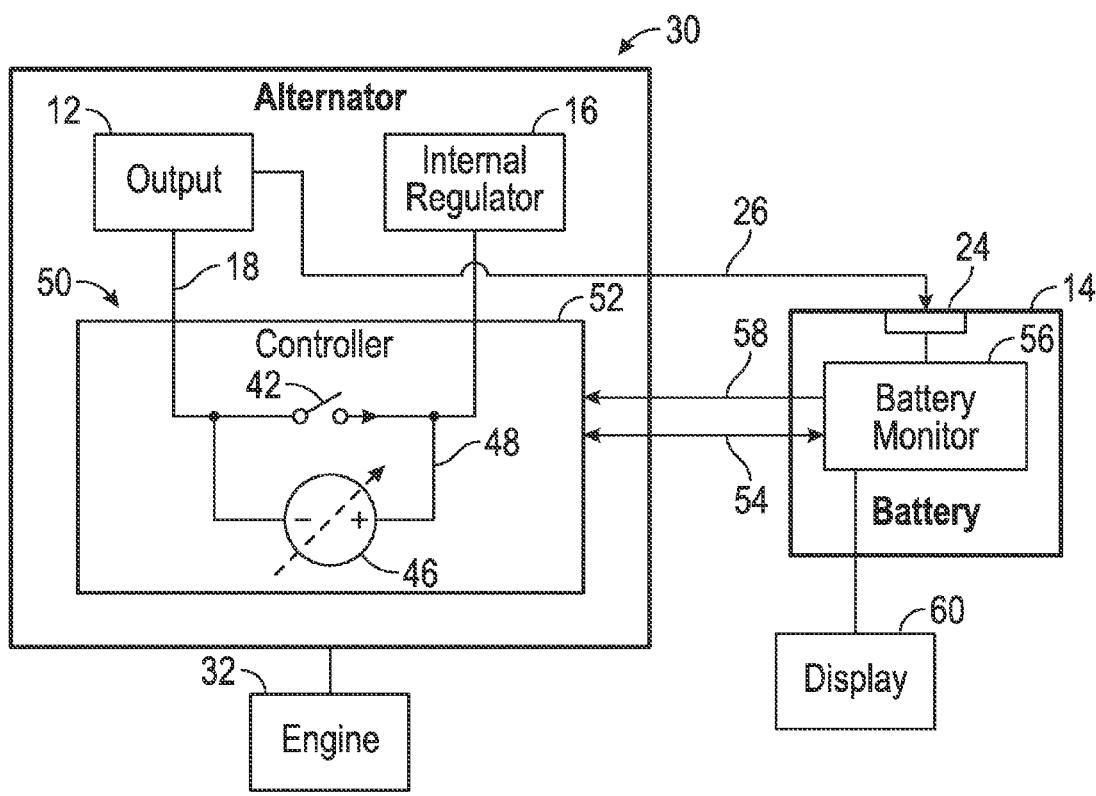
FIG. 4 is a schematic representation of another embodiment of the disclosed alternator control system.

As shown in FIG. 4, in another embodiment, the alternator control system, generally designated 50, may include a controller 52 that is configured to receive information over a communication line 54 from a battery monitor 56. The battery monitor 56 may be located remotely from the alternator 30 and be mounted on or adjacent to the battery or battery array 14. In embodiments, the battery monitor 56 may be connected to the terminals 24 of the battery 14. In this embodiment, the battery monitor 56 may be configured to gather information about the battery 14, such as the current flowing in the system to which the battery is connected, the battery voltage and the battery temperature. The battery monitor 56 may be configured to analyze this information and send a signal over communication line 54 to the controller 52 requesting a specified output voltage from the adjustable voltage source 46.

Figure 1:
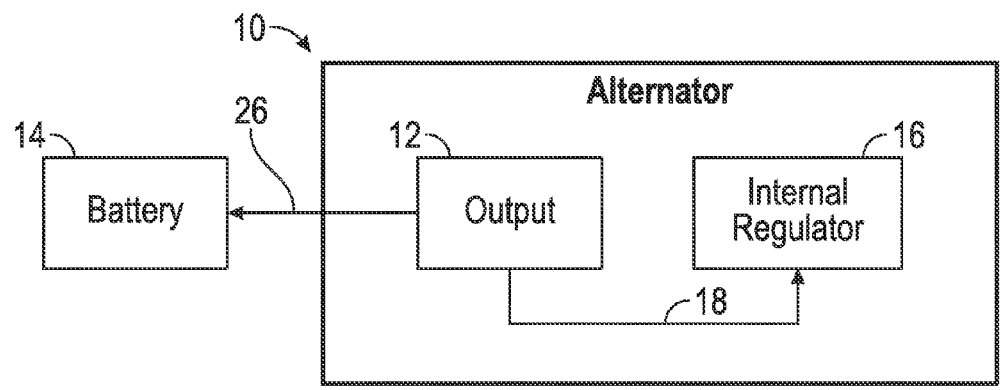
FIG. 1 is a schematic representation of a prior art alternator control system.
Figure 2:
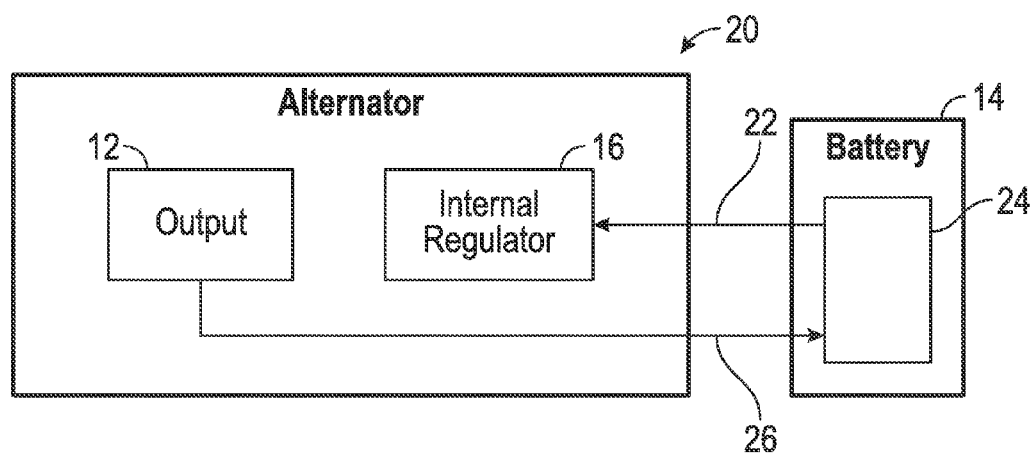
FIG. 2 is a schematic representation of a second prior art alternator control system.

The battery monitor 56 may be configured to provide temperature compensation, multi-state charging, or make any number of other modifications to the actuation of the adjustable voltage source 46 by the controller 52. Because the voltage is being read at the battery 14 by the battery monitor 56, all the advantages of external feedback apply, but because that feedback is removed from the actual feedback loop 18 of the regulator 16, none of the dangers described with respect to the embodiment of FIG. 2 exist.

The battery monitor 56, in the embodiment of FIG. 4, may communicate with the controller 52 over communication line 54, which may be a two-way, serial communication link. However, any communication method may be employed, including wireless communication. The system 50 may include an electrical override line 58. The controller 52 may be configured such that the electrical override line 58 may remove power from the circuitry of the controller 52, and the controller may be configured to close the switch 42 in such an event, thereby restoring internal feedback to the regulator over internal feedback line 18.

In an embodiment, the controller 52 and the battery monitor 56 may be configured to monitor each other over the communications link 54, thereby providing additional safety features. For example, conditions that may trigger the controller to open the switch 42 and alter the output of the alternator may include performing alternator control system 50 safety checks, determining whether the adjustable voltage source is functioning and set to 0 volts, determining whether the engine associated with the alternator 30 is running and whether the alternator is performing properly on internal feedback, whether there is an error-free communication link with the battery monitor 56, determining whether the voltage that the battery monitor is reporting is within a preselected percentage of the alternator output voltage, suggesting proper wiring and connections, determining whether the current output of the alternator within a pre-programmed limit, determining whether the temperature compensation calculation is performed correctly.

In addition, the controller 52 may perform a battery monitor 56 safety check. Such a safety check may include determining whether the engine is running and the alternator performing properly on internal feedback, determining whether there is an error-free communication link with the controller 52, and determining whether the voltage that the battery monitor 56 is reporting is within a certain percentage of the battery voltage, suggesting proper wiring and connections.

If both the controller 52 and the battery monitor 56 pass the aforementioned initial safety checks, the battery monitor may request a modification to the output voltage, of the alternator 30, at which point the controller 52 may open the switch 42 and adjust the voltage at the output 12 to achieve the desired output voltage. With constant communication over communication line 54, the controller 52 and battery monitor 56 may raise or lower the voltage at the output 12 based on any number of criteria.

In an embodiment, the controller 52 may be configured to shut the switch 42, restoring internal feedback to the alternator 30 over feedback line 18 if it detects any number of faults or errors. Such faults or errors may include a command from the battery monitor 56 to shut the switch 42, loss of communication with the battery monitor, communication errors, detection of wiring or connection problems, a loss of control over the alternator's output voltage, including unexpected results, current output of the alternator exceeding a set limit, and calculation errors being made by the battery monitor.

The battery monitor 56 and controller 52 may be configured such that the battery monitor may shut off power to the controller, which may close the switch 42, thereby restoring internal feedback to the alternator 30 over feedback line 18, if it detects any number of faults or errors. Such faults or errors may include loss of communication with the battery monitor, communication errors, detection of wiring or connection problems, and improper regulation, incorrect or unrequested changes in the voltage. The battery monitor 56 may be configured to include additional features such as an electrical de-sulfation device or a low-voltage disconnect. Either the battery monitor 56 or the controller 52 may be configured to provide error information or diagnostic information to an operator at a display 60, which may take the form of LEDs, a display, a monitor or by other means. Either the battery monitor 56 or the controller 52 may be provided to provide historical data to an operator at the display 60, which may take the form of LEDs, a display or by other means, or may be stored, either locally at storage associated with the controller 52, or remotely, for later analysis. The display 60 may be located near the battery monitor 56, or at a location remote from the battery monitor.

The described alternator control systems 40, 50 greatly reduce the risks associated with external voltage feedback because they may have two modes of feedback: internal and external. The alternator 30 used in the system may utilize a conventional, internal, single-voltage regulator 16, which by default receives its feedback internally. As described herein, the disclosed alternator control systems 40, 50 may be able to switch from internal feedback to external feedback and back again. This switching mechanism may be located as close to the voltage regulator 16 as possible to minimize connection problems. In external mode, the alternator control systems 40, 50 may manipulate the external feedback to provide any number of voltage adjustments such as temperature compensation, multi state charging or remote sense. The described alternator control systems 40, 50 may be configured such that if the external feedback is compromised in any way or if the systems lose control of the alternator 30, the systems may automatically revert to internal feedback, thereby protecting the electrical system components. Feedback in external mode may be provided directly with voltage or through some type of communication infrastructure, whether it be wired or wireless.

While the forms of apparatus and methods disclosed herein may constitute preferred embodiments of the invention, it is to be understood that variations may be made therein without departing from the scope of the invention.

What is claimed is:

1. An alternator control system for use with an alternator configured to provide a charging voltage to a battery and having an internal output voltage regulator that measures and regulates the charging voltage through an internal feedback line, the system comprising:
   a switch on the internal feedback line;
   a variable voltage source connected to the internal output voltage regulator;
   an external feedback line configured to be connected to measure a condition of the battery receiving the charging voltage at the battery; and
   a controller connected to receive a signal corresponding to the condition of the battery over the external feedback line, and in response thereto, selectively open the switch, and selectively actuate the variable voltage source to selectively vary the voltage input to the internal output voltage regulator, thereby causing the internal output voltage regulator to signal the alternator to correspondingly vary the output voltage so that a voltage reaching the battery is at a pre-set value.

2. The alternator control system of claim 1, wherein the variable voltage source is on the internal feedback line.

3. The alternator control system of claim 2, wherein the variable voltage source is connected in parallel with the switch.

4. The alternator control system of claim 1, wherein the controller is configured to selectively increase and decrease the voltage input to the internal output voltage regulator.

5. The alternator control system of claim 1, wherein the controller is configured to close the switch and disable the variable voltage source in the event an error condition is detected in the signal received over the feedback line, whereby the internal output voltage regulator measures charging voltage at the alternator.

6. The alternator control system of claim 1, wherein the external feedback line is connected to the terminals of the battery.

7. The alternator control system of claim 1, wherein the external feedback line is configured to be connected to a battery monitor, whereby the controller receives signals from the battery monitor over external feedback line.

8. The alternator control system of claim 7, wherein the battery monitor is connected to be located at the battery and remote from the alternator.

9. The alternator control system of claim 1, wherein the battery monitor is connected to the terminals of the battery.

10. The alternator control system of claim 7, wherein the battery monitor is configured to provide signals to the controller corresponding to one or more of temperature compensation and multi-stage charging.

11. The alternator control system of claim 7, wherein the controller is configured to communicate with the battery monitor by a serial communications link.

12. The alternator control system of claim 11, wherein the controller is configured to provide a controller safety check prior to opening the switch.

13. The alternator control system of claim 12, wherein the controller safety check includes one or more of determining whether the adjustable voltage source is set to 0 volts, determining whether an engine associated with the alternator is running and the alternator is performing properly on internal feedback, determining whether there is an error-free communications link with the battery monitor, determining whether a voltage that the battery monitor is reporting is within a pre-programmed range, and whether a temperature compensation calculation is performed correctly.

14. The alternator control system of claim 11, wherein the battery monitor is configured to perform a battery monitor safety check prior to the controller opening the switch.

15. The alternator control system of claim 11, wherein the battery monitor safety check includes one or more of determining whether an engine associated with the alternator is running and performing properly on internal feedback, determining whether there is an error-free communication link with the controller over the serial communications link, and determining whether the voltage that the controller is reporting within a pre-set percentage of the battery voltage.

16. The alternator control system of claim 11, wherein the controller is configured to shut the switch, and thereby restore internal feedback through the internal feedback line, in the event of the occurrence of one or more error conditions, including receiving a command from the battery monitor to close the switch, a loss of communication with the battery monitor, a communication error, a detection of a connection problem, a detection of loss of control of an output voltage of the alternator, detecting a current output of the alternator exceeding a pre-set limit, and detecting calculation errors made by the battery monitor.

17. The alternator control system of claim 11, wherein the battery monitor is configured to shut off power to the controller, causing the controller to close the switch, thereby restoring internal feedback to the alternator, in the event an error condition is detected, the error conditions including one or more of loss of communication with the controller, detection of a communication error, detection of a connection problem, detection of improper regulation, detection of an unrequested change in the charging voltage, and detection of an incorrect change in the charging voltage.

18. The alternator control system of claim 7, wherein the controller is configured to receive an electrical override signal that removes power from the controller, closes the switch, and restores internal feedback to the internal voltage regulator.

19. An alternator control system for use with an alternator configured to provide a charging voltage to a battery and having an internal output voltage regulator that measures and regulates the charging voltage through an internal feedback line, the system comprising:
  a switch on the internal feedback line;
  a variable voltage source connected to the internal output voltage regulator;
  an external feedback line configured to be connected to a battery monitor located remote from the alternator and at the battery to measure a condition of the battery receiving the charging voltage at the battery; and
  a controller connected to receive a signal from the battery monitor corresponding to the condition of the battery over the external feedback line, and in response thereto, selectively open the switch, and selectively actuate the variable voltage source to selectively vary the voltage input to the internal output voltage regulator, thereby causing the internal output voltage regulator to signal the alternator to correspondingly vary the output voltage so that a voltage reaching the battery is at a pre-set value.

20. A method for controlling an alternator for use with an alternator configured to provide a charging voltage to a battery and having an internal output voltage regulator that measures and regulates the charging voltage through an internal feedback line, the method comprising:
  providing a switch on the internal feedback line;
  providing a variable voltage source connected to the internal output voltage regulator;
  measuring a condition of the battery receiving the charging voltage at the battery through an external feedback line; and
  receiving a signal corresponding to the condition of the battery over the external feedback line, and in response thereto, selectively opening the switch, and selectively actuating the variable voltage source and selectively varying the voltage input to the internal output voltage regulator, thereby causing the internal output voltage regulator to signal the alternator to correspondingly vary the output voltage so that a voltage reaching the battery is at a pre-set value.

* * * * *